United States Patent [19]

Cournoyer

[11] 3,949,640

[45] Apr. 13, 1976

[54] MUSICAL CHORDS TEACHING AND INDICATING DEVICES

[76] Inventor: Georges A. Cournoyer, 480 Chapman St., St. Bruno, Quebec, Canada

[22] Filed: Dec. 9, 1974

[21] Appl. No.: 531,195

[52] U.S. Cl. .................................................. 84/473
[51] Int. Cl.² .......................................... G09B 15/02
[58] Field of Search ............................ 84/477–482, 84/470, 471, 473, 474

[56] References Cited

UNITED STATES PATENTS

| | | | |
|---|---|---|---|
| 1,091,865 | 3/1914 | Scroggs | 84/473 |
| 2,193,885 | 3/1940 | Riley | 84/471 |
| 3,592,099 | 7/1971 | Gibby | 84/473 |

*Primary Examiner*—John F. Gonzales

[57] ABSTRACT

A device of the type of a slide rule and adapted to indicate and teach musical data and, in particular, the chords, their construction and relationship, and their easy transposition from one key to another. This device includes a base member having a rectilinear groove in the front face, a ruler slidable in this groove, a chromatic scale marked on the front face of the ruler, diatonic scales of the major and its direct minor modes marked along the opposite edges respectively of the groove, and chord indicators on the front face of the base member and bearing coded identification of their interval, their localizations, their qualification, their components thirds and their distinctive notes. In a particular embodiment, the indicators indicate the major common chords and their derivatives and the pointers indicate the modal and tonal notes of each chord when concerned.

8 Claims, 2 Drawing Figures

MUSICAL CHORDS TEACHING AND INDICATING DEVICES

This invention relates to a device for the teaching of music and, more particularly, to a device of the type of a slide rule and adapted to indicate and teach musical data.

So far, there have been proposed a large number uf such devices adapted to teach different musical data and, in particular, chords. However, these anterior devices have been made to teach a limited number of diverse chords with the obvious object to provide a practical device for the musician, but not a tool to teach chords and their construction and the theoretical relationship between them. These prior art devices thus constitute incomplete tools for the transposition of the chords from one key to another.

It is a general object of the present invention to provide a device of the above type which includes all the chords, which is adapted to readily transpose these chords from one key to another, and which is of simple construction and easy to read to form an efficient tool for the theoretical teaching of musical data and, in particular, the chords.

It is another object of the present invention to provide a device of the above-mentioned type which defines all the major common chords and their derivatives, the modal note of each concerned chord, in the major and the direct minor modes, and tonal notes for the three major chords in the major mode.

Figure 1:
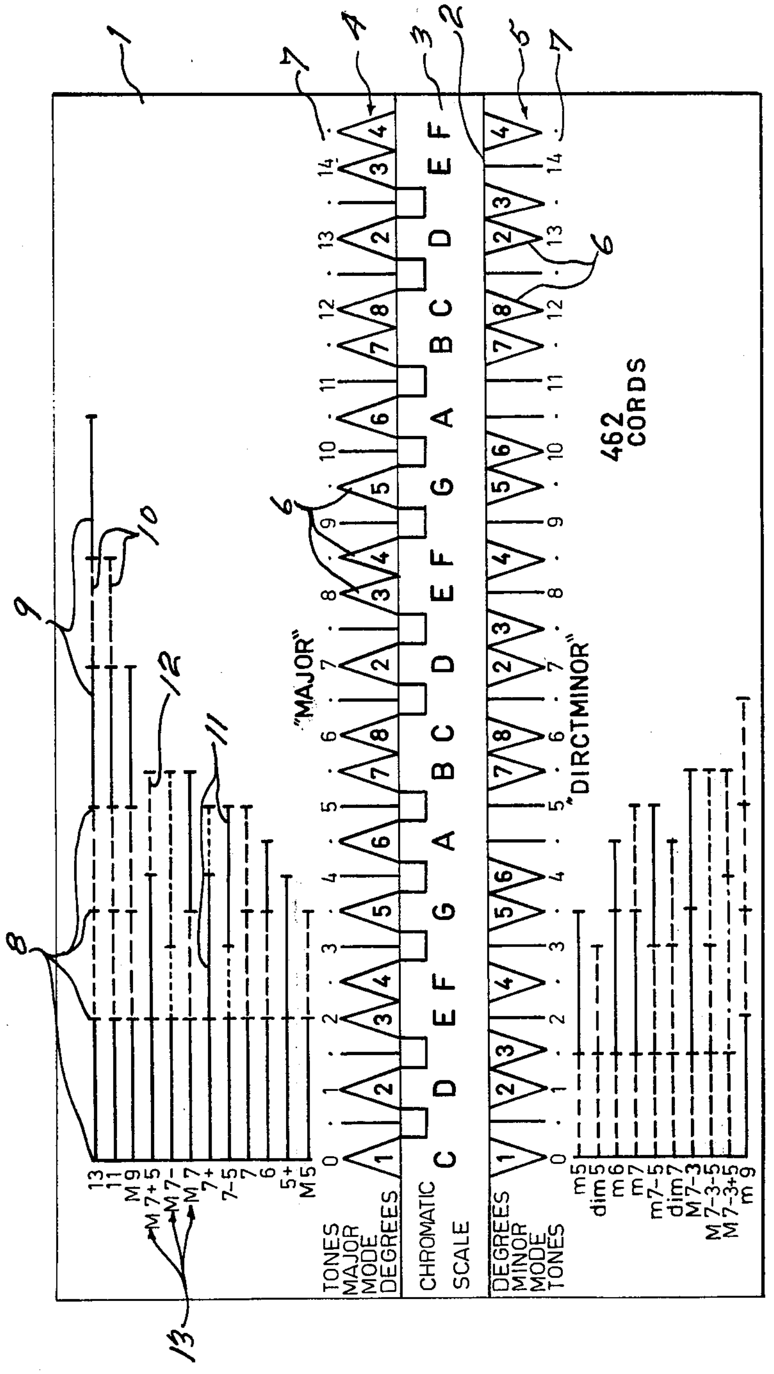
Figure 2:
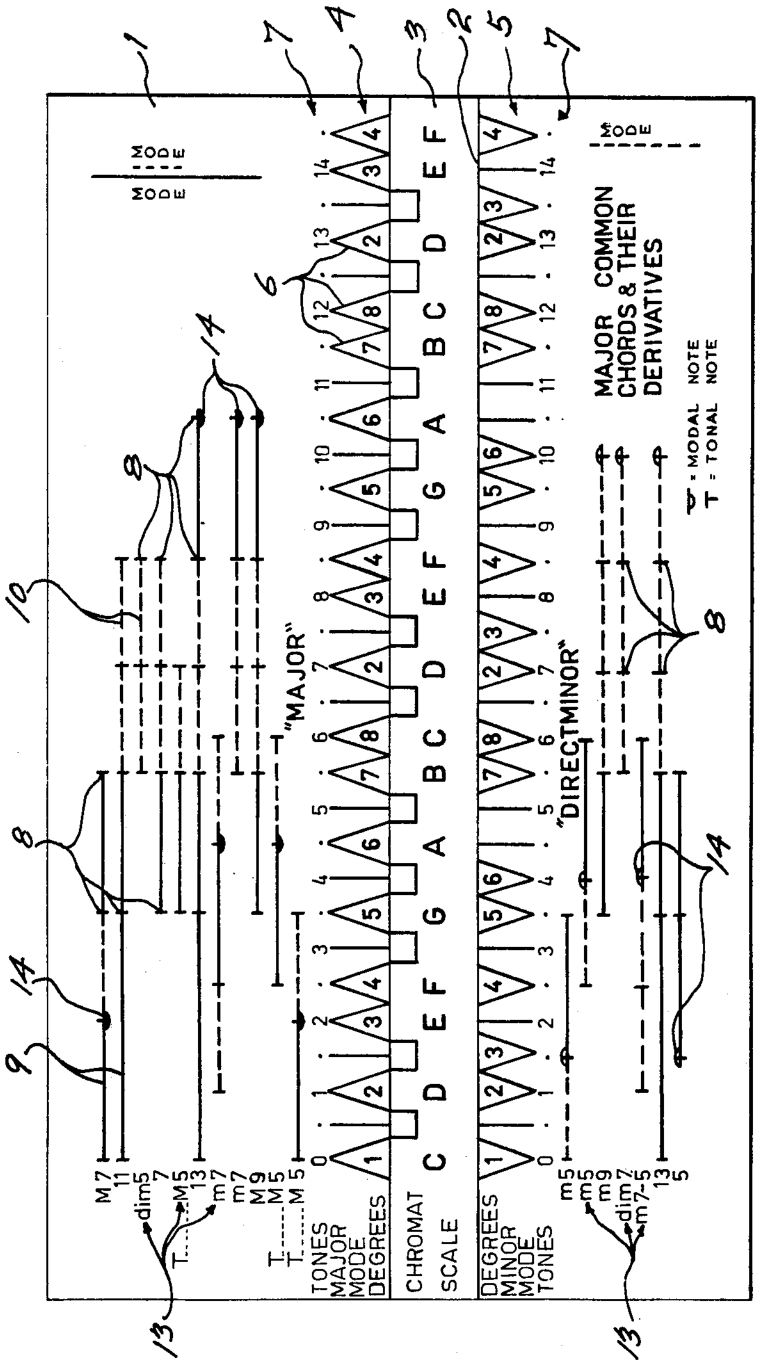

The above and other objects and advantages of the present invention will be better understood in the light of the following detailed description of preferred embodiments thereof, which are illustrated, by way of example only, in the accompanying drawings, in which:

FIG. 1 is a plan view of a chords teaching and indicating device according to a first embodiment of the invention; and FIG. 2 is a plan view of a device according to a second embodiment of the invention and pertaining solely to the tonal chords and their derivatives.

Both illustrated chords teaching devices include a base member 1 having a rectilinear groove 2 in the front face thereof. A ruler 3 is slidable endwise in the groove 2.

The diatonic scales 4 and 5 of the major and direct minor modes are marked along the opposite edges respectively of the groove 2 and each includes triangular degree marks 6 positioned according to the law of the corresponding mode. The diatonic scales 4 and 5 are graduated into the same equidistant tonal relationship and are marked with the tone numbers 7.

The chromatic scale is marked on the ruler 3 with the same equidistant tonal spacing relationship as the diatonic scales. A conventional keyboard with the white and black keys is marked on the chromatic scale.

Chord indicators are marked on the front face of the base member 1 and each includes pointers or marks 8 pointing toward the diatonic and chromatic scales to define the distinctive notes of the corresponding chords on the chromatic scale. The pointers 8 divide the chords into component thirds, the tonal span of which is defined by a line running lengthwise of the scales 4 and 5. Each of these lines is distinctively color coded according to the qualification of the corresponding third. Obviously, another type of code could be used to distinctively identify the qualification of each third and, consequently, of the whole chords. Thus, the chords include lines 9, 10, 11, and 12, which are colored to distinctively identify the major, minor, diminished and augmented qualifications respectively of the component thirds. Each chord is marked with a color-coded name 13 to distinctively define the overall interval thereof.

In the second embodiment, shown in FIG. 2, all the chords all constitute tonal chords and derivatives thereof. An additional pointer 14 is positioned along each chord indicator concerned to indicate the corresponding modal note of that chord. Same applies for tonal notes.

With the embodiment of FIG. 1, it may be seen that the chord of any fundamental note may be obtained by sliding the ruler 3, such as to register this note with the first degree and tonal number zero, of any diatonic scale. The distinctive notes of the selected chord may then be read in transverse alignment with all the pointers 8 of the corresponding chord indicator.

In the case of the embodiment of FIG. 2, any tonal chord or derivative thereof may be defined by first sliding the ruler to obtain the desired key. For instance, for the key of any selected note, this key-note has to register with the zero tone number. The distinctive tones and the modal tone of a tonal chord may be read in transverse alignment with the pointers 8 and the pointer 14 of the corresponding chord.

It must be noted that the base member 1 constitutes a flat base having a front face and the rectilinear groove 2 formed therein, dividing the latter into two separate areas defining a major mode zone above the groove 2 and ruler 3 and a minor mode zone below the groove and ruler. The chord indicators represent chords of the major mode and chords of the direct minor mode. The indicators for the chords of the major mode and the diatonic scale 4 for the major mode are positioned in the major mode zone separately from the diatonic scale 5 and the indicators for the direct minor mode which are positioned in the minor mode zone.

The tonal notes are the three notes of an octave which are considered to essentially define the tonality of the octave. These tonal notes are on the first, fourth, and fifth degrees of the octave.

The modal notes are the two notes of an octave whose position is distinctive of the mode of an octave. These notes are on the third and sixth degrees of an octave.

The tonal chords are the three triads whose root is one of the three tonal notes.

What I claim is:

1. A musical chords teaching and indicating device comprising a first and a second member slidably connected one to the other, a chromatic scale having the musical notes marked on one face of said second member and arranged for endwise displacement relative to said first member, one diatonic scale marked on said first member laterally adjacent to said chromatic scale, chord indicators marked on said first member laterally adjacent said diatonic scale and including pointers of distinctive notes of said chords pointing toward said diatonic scale and said chromatic scale and forming dividers located at the specific degrees of the ends of the component thirds of the chords, with a qualification code distinctively identifying the qualification of each of said component thirds as a diminished, augmented, major, or minor.

2. A musical chords teaching and indicating device as defined in claim 1, wherein distinctive code marks are provided on said first member adjacent said indicators respectively and distinctively identifying the name and quality of the chord represented by the latter.

3. A musical chords teaching and indicating device as defined in claim 2, wherein said qualification code is a color code and said marks include letters, numerals, and said color code indicative of the qualification of the corresponding chord.

4. A musical chords teaching and indicating device as defined in claim 3, wherein said indicators include lines running along said chromatic and diatonic scales, each between a selected pair of degrees of the latter and divided into sections by said pointers with each of said sections corresponding to one of said thirds and being made in color according to said color code to distinctively indicate the qualification of the corresponding third.

5. A musical chords teaching and indicating device as defined in claim 1, wherein said pointers include a distinctive modal note pointer each positioned along one of the indicators of the chords in transverse registry with a corresponding modal note and the indicators include the letter T positioned adjacent each tonal chord whereby to identify the tonal tone at the root of the latter.

6. A musical chords teaching and indicating device as defined in claim 4, wherein said one diatonic scale is marked in the major mode, said first member includes another diatonic scale marked thereon in the direct minor mode, said indicators indicate common chords and the derivatives thereof of both diatonic scales, and a scale of consecutive tone numbers is marked along each of said diatonic scales whereby to readily measure the interval of each chord.

7. A musical chords teaching and indicating device as defined in claim 1, wherein said first member has an external surface divided into two separate areas by said second member with said areas defining a major mode zone and a minor mode zone on opposite sides respectively of the chromatic scale, said first member includes another diatonic scale marked thereon, said indicators represent chords of the major mode and chords of the direct minor mode, said one diatonic scale and the indicators for the chords of the major mode are positioned in the major mode zone separately from said another diatonic scale and the indicators for the chords of the direct minor mode which are positioned in the minor mode zone.

8. A musical chords teaching and indicating device as claimed in claim 6, wherein said first member constitutes a flat base having a front face and a rectilinear groove, dividing the latter into two separate areas defining a major mode zone and a minor mode zone on opposite sides respectively of said groove, said indicators represent chords of the major mode and chords of the direct minor mode, said second member constitutes a ruler slidable endwise in said groove, said one diatonic scale and the indicators for the chords of the major mode are positioned in the major mode zone separately from said another diatonic scale and the indicators for the chords of the direct minor mode which are positioned in the minor mode zone, said pointers include a distinctive modal note pointer each positoned along one of the indicators of the chords in transverse registry with a corresponding modal note, and the indicators include the letter T positioned adjacent each tonal chord whereby to identify the tonal tone at the root of the latter.

* * * * *